United States Patent Office.

FRANCIS PEYRE PORCHER, OF CHARLESTON, SOUTH CAROLINA.

Letters Patent No. 98,884, dated January 18, 1870.

IMPROVEMENT IN MATERIALS FOR TANNING, DYEING, AND FOR OTHER PURPOSES.

The Schedule referred to in these Letters Patent and making part of the same.

Be it known that I, FRANCIS PEYRE PORCHER, of the city of Charleston, in the State of South Carolina, have made a new and valuable discovery, by which a large proportion of tannin, to be used in the arts, and also a valuable coloring-matter can be obtained from a natural product heretofore valueless, of which the following is a specification.

The product to which reference is made as above, is the leaf of the gum-tree, or sweet gum, as it is sometimes called, the botanical name of which is *Liquidambar styraciflua.*

These leaves may be gathered at any period of their growth, but I prefer to wait until they are fully matured; and the action of light frosts upon them is not prejudicial, as far as my experience enables me to judge.

These leaves, when dried, may be packed and sent to market in their crude form, and in that shape will be found of very great value in the tanning of leather. But I prefer to extract their properties, so that they may be transported and used in a condensed form.

For this purpose I prefer to use the following process:

The leaves having been dried and ground, I saturate them with a solution of washed ether. One part of ether to three or more parts of water, answers well for this purpose. This should be done in a large reservoir, lined with porcelain or copper; or a funnel-shaped digester, closely covered, may be used for that purpose.

In this condition it should be allowed to remain twenty-four hours, in order to dissolve the soluble portion of the substance.

The solution should then be made to perlocate or drain through cotton or other porous substance, and received in a copper or porcelain-lined evaporating-reservoir, placed over a furnace, where it is afterward to be evaporated.

The reservoir aforesaid should be furnished with a stop-cock, so placed that the upper surface of the liquid to be evaporated should be kept at or just below the said stop-cock, in order that the supernatant chlorophyl and coloring-principles may be drawn off, without drawing off the liquid itself.

If any coloring - principles afterwards remain, I throw upon the surface of the liquid, shavings of the northern or Weymouth pine, or of the poplar, which being removed, will have green or other coloring-matter adhering to them.

The shavings of the timber may be used for this purpose, but I prefer those above mentioned.

The coloring-matter thus drawn off or removed may be used for dyeing, and will be found of great value for that purpose.

I then evaporate the residue in the usual way, collecting the ether in a condenser, for further use.

The remaining extract is almost pure tannin, incorporated with some coloring-matter.

The solid matter which was used in the previous portion of this process, may then be treated with alcohol, diluted with about four times its volume of water.

After remaining five hours or longer, to digest and to dissolve still further the soluble portion of the substance, the solution may be drawn off in the same way as has been above described, and evaporated in like manner, collecting the alcohol for further use.

The remaining extract is tannin, with a small portion of gum and rosin incorporated therewith, as well as a black or brownish or yellowish-black coloring-matter.

The extracts obtained, as hereinbefore described, may be further dried, and have the water, with which they are still combined, drawn off, by inverting the reservoir or dish which contains it over a fire, if such reservoir is not too large for this purpose; or the same effect may be produced by subjecting the extract to reflected heat in any other way.

The product or mass is thus rendered lighter colored, and is easily powdered.

A less pure extract of tannin, containing gum-resins and coloring-matter, may be produced by macerating the ground or powdered leaves before mentioned in water alone, and then boiling, straining, and evaorating the fluid. The extract thus obtained is sufficiently pure to be used in the preparation of leather, or in dyeing.

This latter process of extraction is not claimed as patentable.

By the addition of diluted sulphuric acid to the ethereal, alcoholic, or watery extracts above mentioned, before their complete evaporation, the coloring-principles residing in those extracts are intensified, and become blacker, to be used in dyeing; or commercial sulphate of iron may be added, to produce a similar result, and for the manufacture of inks, in which case iron vessels may be employed.

For this same purpose of tanning and coloring, and to be treated in the same manner as above described, I use the leaves of a shrub growing abundantly in damp pine lands, known as the *Clethra alnipolia,* (of Linnæus,) and as the *Clethra tomentosa,* (of Lamarque,) and which shrub is commonly known as the white alder.

Having thus described my discovery and invention,

What I claim as new, and desire to secure by Letters Patent, is—

1. The use of the leaves of the gum - tree and white alder, as applied to the purposes hereinbefore described.

2. The hereinbefore-described processes, by which the virtues of those leaves can be extracted and prepared for use, as aforesaid.

3. The new article of manufacture herein described, produced by drying and packing the leaves of the species of plants herein named, as set forth.

4. The improved tanning-extract produced by treating the leaves of the sweet gum, *Clethra tomentosa,* or other similar plants, substantially as herein described.

Signed in presence of two witnesses.

FRANCIS PEYRE PORCHER.

Witnesses:
R. T. CAMPBELL,
J. N. CAMPBELL